United States Patent
Saito et al.

(10) Patent No.: US 10,935,755 B2
(45) Date of Patent: Mar. 2, 2021

(54) OPTICAL SYSTEM AND IMAGE PICKUP APPARATUS

(71) Applicant: CANON KABUSHIKI KAISHA, Tokyo (JP)

(72) Inventors: Shinichiro Saito, Utsunomiya (JP); Makoto Nakahara, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 92 days.

(21) Appl. No.: 16/051,787

(22) Filed: Aug. 1, 2018

(65) Prior Publication Data
US 2019/0041605 A1    Feb. 7, 2019

(30) Foreign Application Priority Data

Aug. 7, 2017   (JP) ............................. JP2017-152258

(51) Int. Cl.
| | |
|---|---|
| *G02B 9/12* | (2006.01) |
| *G02B 15/14* | (2006.01) |
| *H04N 5/225* | (2006.01) |
| *G02B 27/00* | (2006.01) |

(52) U.S. Cl.
CPC ............. *G02B 9/12* (2013.01); *G02B 15/142* (2019.08); *G02B 27/0037* (2013.01); *H04N 5/2254* (2013.01)

(58) Field of Classification Search
CPC ..... G02B 9/12; G02B 27/0037; H04N 5/2254
See application file for complete search history.

(56) References Cited

U.S. PATENT DOCUMENTS

| | | | |
|---|---|---|---|
| 3,997,248 | A | 12/1976 | Fujii |
| 2012/0229921 | A1 | 9/2012 | Eguchi |
| 2016/0341958 | A1 | 11/2016 | Eguchi |
| 2017/0131620 | A1 | 5/2017 | Nakahara |

FOREIGN PATENT DOCUMENTS

| | | |
|---|---|---|
| JP | S50124634 A | 9/1975 |
| JP | S5965820 A | 4/1984 |
| JP | 2000227546 A | 8/2000 |
| JP | 2009271166 A | 11/2009 |
| JP | 2012189679 A | 10/2012 |
| JP | 2013097212 A | 5/2013 |
| JP | 2014211497 A | 11/2014 |
| JP | 2015102810 A | 6/2015 |
| JP | 2016218276 A | 12/2016 |

OTHER PUBLICATIONS

Japanese Office Action for application No. 2017152258 dated Jul. 2, 2019 with English translation.

*Primary Examiner* — Jack Dinh
(74) *Attorney, Agent, or Firm* — Carter, Deluca & Farrell LLP

(57) ABSTRACT

Provided is an optical system including, in order from an object side to an image side: a first lens unit having a positive refractive power; a second lens unit having a negative refractive power configured to move during focusing; and a third lens unit. An interval between each pair of adjacent lens units is changed during focusing. The optical system includes an aperture stop. The first lens unit includes at least three positive lenses including a positive lens (G1P) arranged closest to the object side. A distance LD on an optical axis from a lens surface closest to the object side of the optical system to an image plane, a focal length "f" of the optical system, a refractive index ndG1P of a material of the positive lens (G1P), and an Abbe number vdG1P of the material of the positive lens (G1P) are each appropriately set.

18 Claims, 6 Drawing Sheets

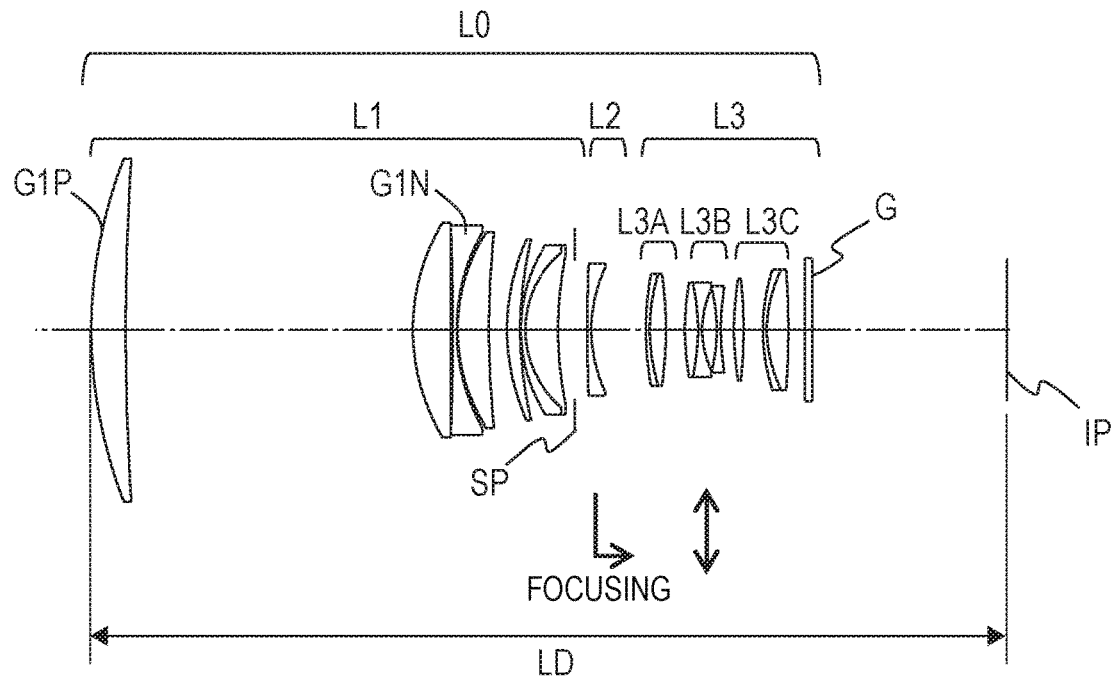
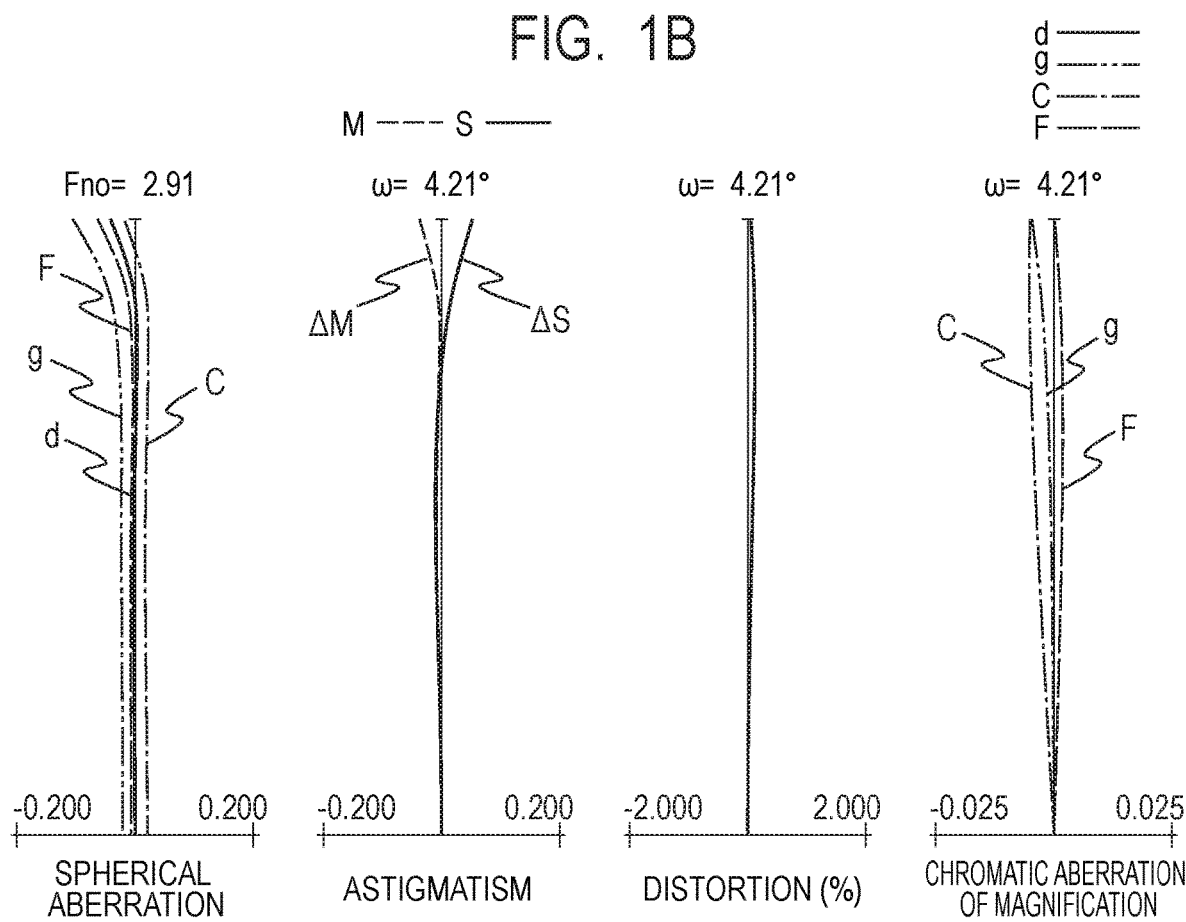

OPTICAL SYSTEM AND IMAGE PICKUP APPARATUS

BACKGROUND OF THE INVENTION

Field of the Invention

The present invention relates to an optical system and an image pickup apparatus.

Description of the Related Art

As an optical system for use with an image pickup apparatus, for example, a digital camera or a video camera, an optical system of a telephoto type having a long focal length, a small f-number, and a large aperture is required. There is also required an optical system that enables easy and fast focusing and has high optical performance by satisfactorily correcting various aberrations, in particular, chromatic aberrations, which significantly affect the optical performance, for example. In the related art, optical systems that satisfy the above-mentioned requirements are known.

For example, there is known an optical system employing an inner focus system, which consists of, in order from an object side to an image side, a first lens unit having a positive refractive power, a second lens unit having a negative refractive power, and a third lens unit having a positive refractive power, and in which the second lens unit is configured to move during focusing (U.S. Patent Application Publication No. 2016/0341958). There is also known an optical system consisting of, in order from an object side to an image side, a first lens unit having a positive refractive power, a second lens unit having a positive or negative refractive power, and a third lens unit having a positive or negative refractive power, in which the second lens unit is configured to move during focusing (U.S. Patent Application Publication No. 2012/0229921).

The optical system of the telephoto type having the large aperture has a large lens effective diameter, and the entire lens system has a large size and a heavy weight. For example, when a mass of a focus lens unit is increased, a mechanical mechanism configured to drive the focus lens unit is increased in size, and hence the entire optical system is increased in size. In contrast, an optical system employing the inner focus system can perform focusing with a lens unit having a relatively small size and light weight, and enables easy and fast focusing.

However, in general, as compared to a focus system in which the entire optical system is configured to move, in the inner focus system, large variations in aberration are caused when the focus lens unit is moved, and it becomes difficult to satisfactorily perform aberration correction over the entire object distance. Therefore, in order to satisfactorily correct chromatic aberrations with the use of the inner focus system to obtain high optical performance in the optical system of the telephoto type, it is important to appropriately set optical arrangement of lens units forming the optical system, and a refractive power and a lens configuration of each of the lens units, for example.

SUMMARY OF THE INVENTION

According to one embodiment of the present invention, there is provided an optical system including, in order from an object side to an image side: a first lens unit having a positive refractive power; a second lens unit having a negative refractive power configured to move during focusing; and a third lens unit, wherein an interval between each pair of adjacent lens units is changed during focusing, wherein the optical system includes an aperture stop, wherein the first lens unit includes at least three positive lenses including a positive lens G1P arranged closest to the object side, and wherein the conditional expressions:

$$LD/f<1.0;$$

$$1.58<ndG1P<1.8; \text{ and}$$

$$63<vdG1P<75,$$

are satisfied where LD represents a distance on an optical axis from a lens surface closest to the object side of the optical system to an image plane, f represents a focal length of the optical system, ndG1P represents a refractive index of a material of the positive lens G1P, and vdG1P represents an Abbe number of the material of the positive lens G1P.

Further features of the present invention will become apparent from the following description of exemplary embodiments with reference to the attached drawings.

BRIEF DESCRIPTION OF THE DRAWINGS

FIG. 1A is a lens cross-sectional view of an optical system according to Embodiment 1 of the present invention when focused at infinity.

FIG. 1B is an aberration diagram of the optical system according to Embodiment 1 when focused at infinity.

DESCRIPTION OF THE EMBODIMENTS

Preferred embodiments of the present invention will now be described in detail in accordance with the accompanying drawings.

Now, exemplary embodiments of the present invention are described with reference to the accompanying drawings. An optical system according to one embodiment of the present invention includes, in order from an object side to an image side, a first lens unit having a positive refractive power, a second lens unit having a negative refractive power, and a third lens unit. The second lens unit is configured to move during focusing, and an interval between each pair of adjacent lens units is changed. A "lens unit" as used herein is only required to include one or more lenses, and may not include a plurality of lenses.

Figure 2A:
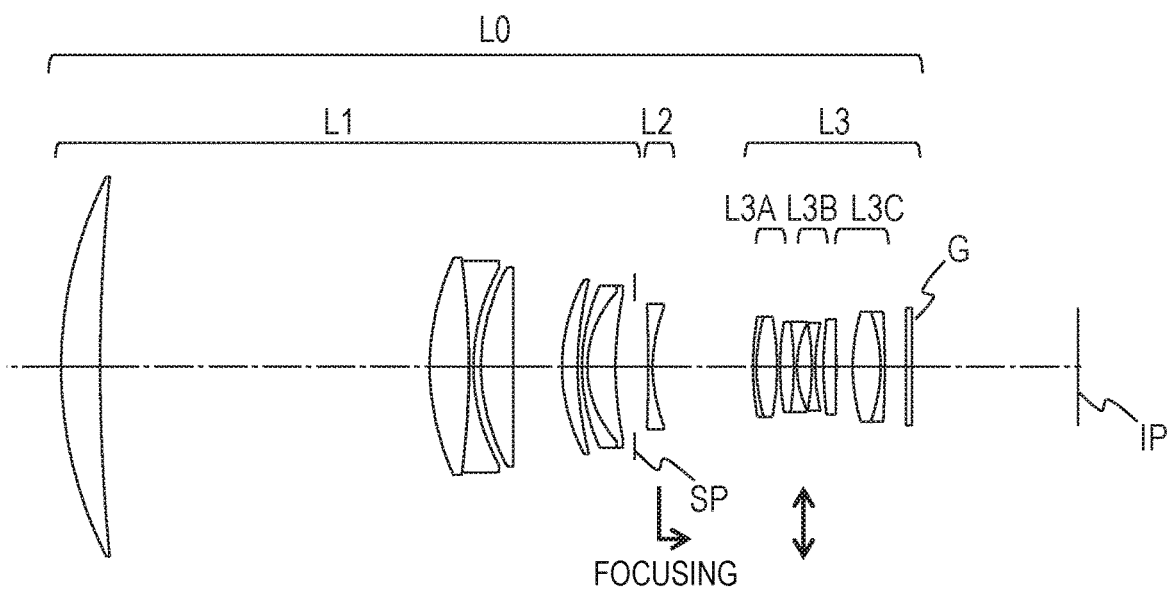
FIG. 2A is a lens cross-sectional view of an optical system according to Embodiment 2 of the present invention when focused at infinity.
Figure 2B:
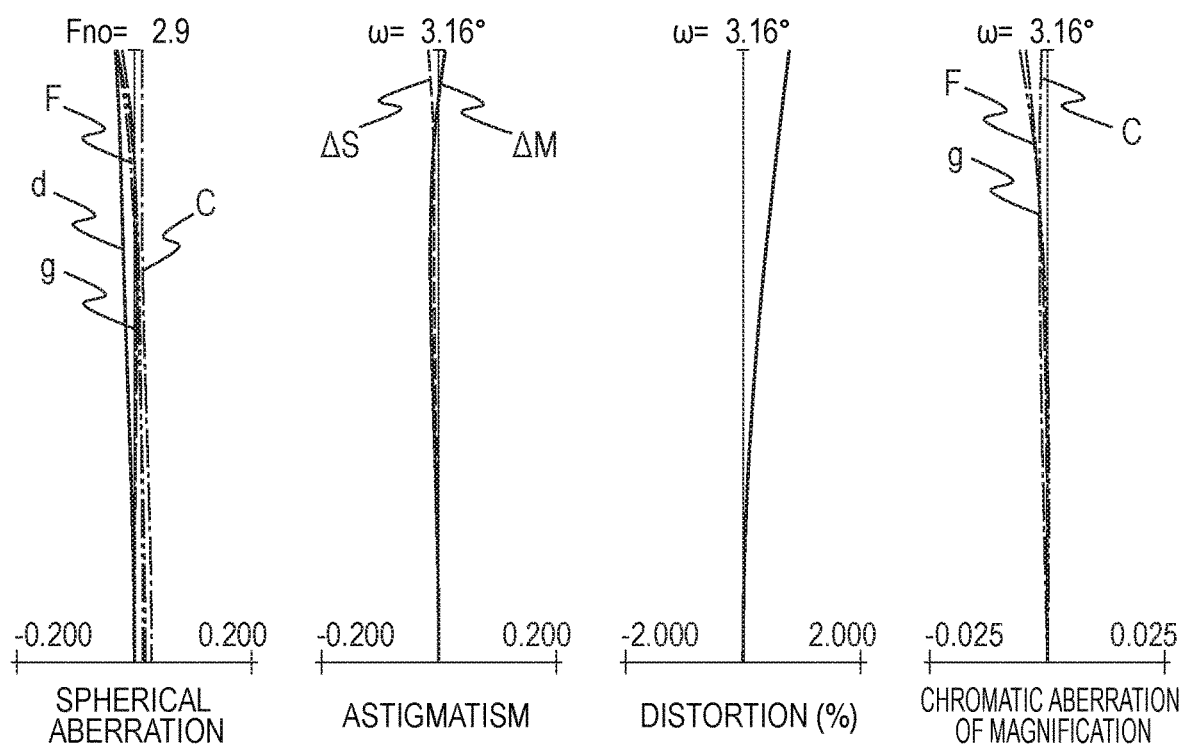
FIG. 2B is an aberration diagram of the optical system according to Embodiment 2 of the present invention when focused at infinity.
Figure 3A:
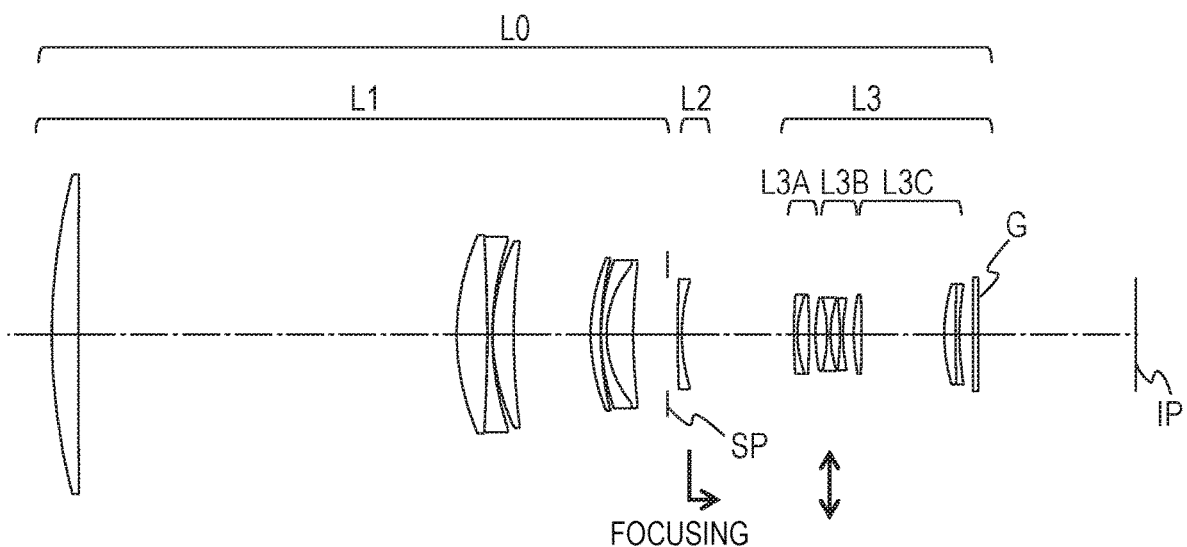
FIG. 3A is a lens cross-sectional view of an optical system according to Embodiment 3 of the present invention when focused at infinity.
Figure 3B:
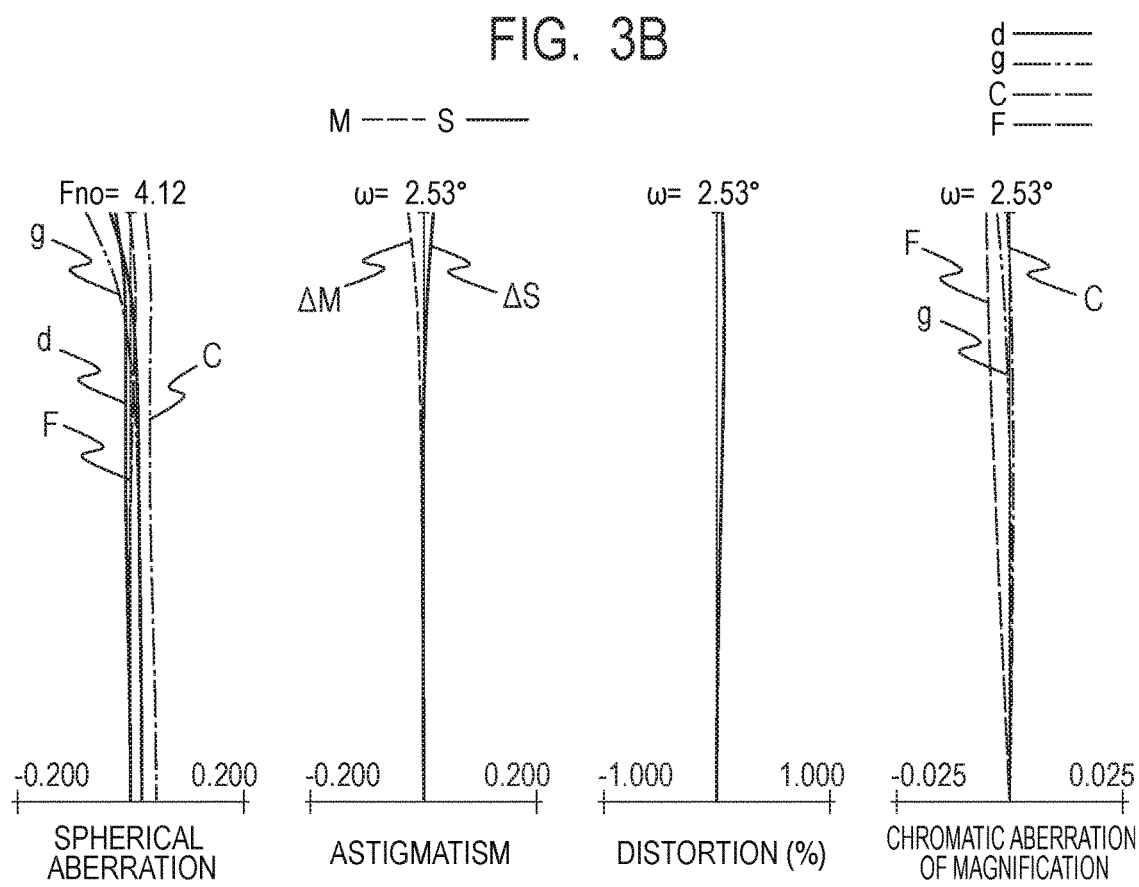
FIG. 3B is an aberration diagram of the optical system according to Embodiment 3 of the present invention when focused at infinity.
Figure 4A:
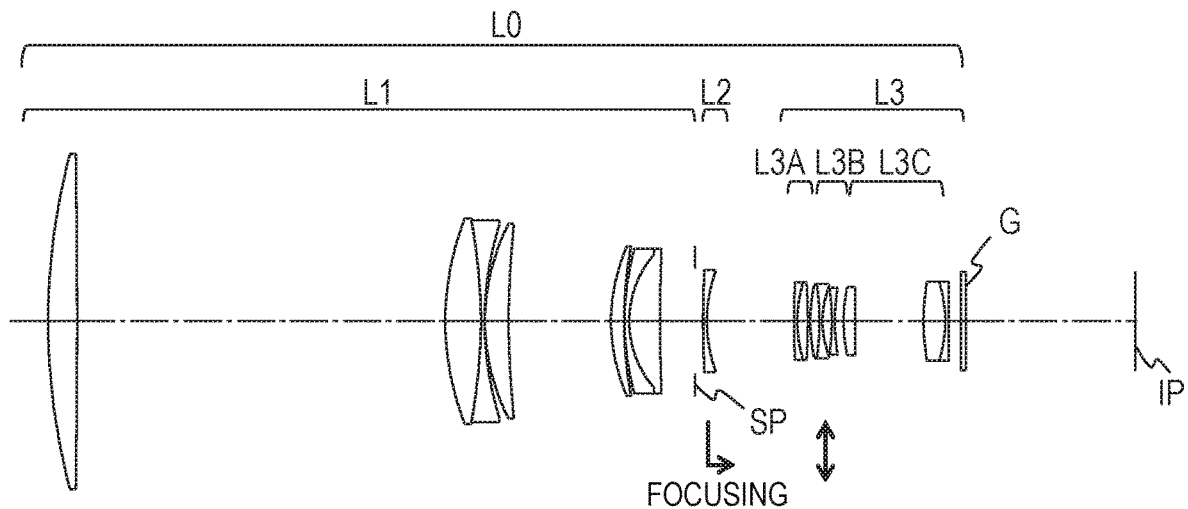
FIG. 4A is a lens cross-sectional view of an optical system according to Embodiment 4 of the present invention when focused at infinity.
Figure 4B:
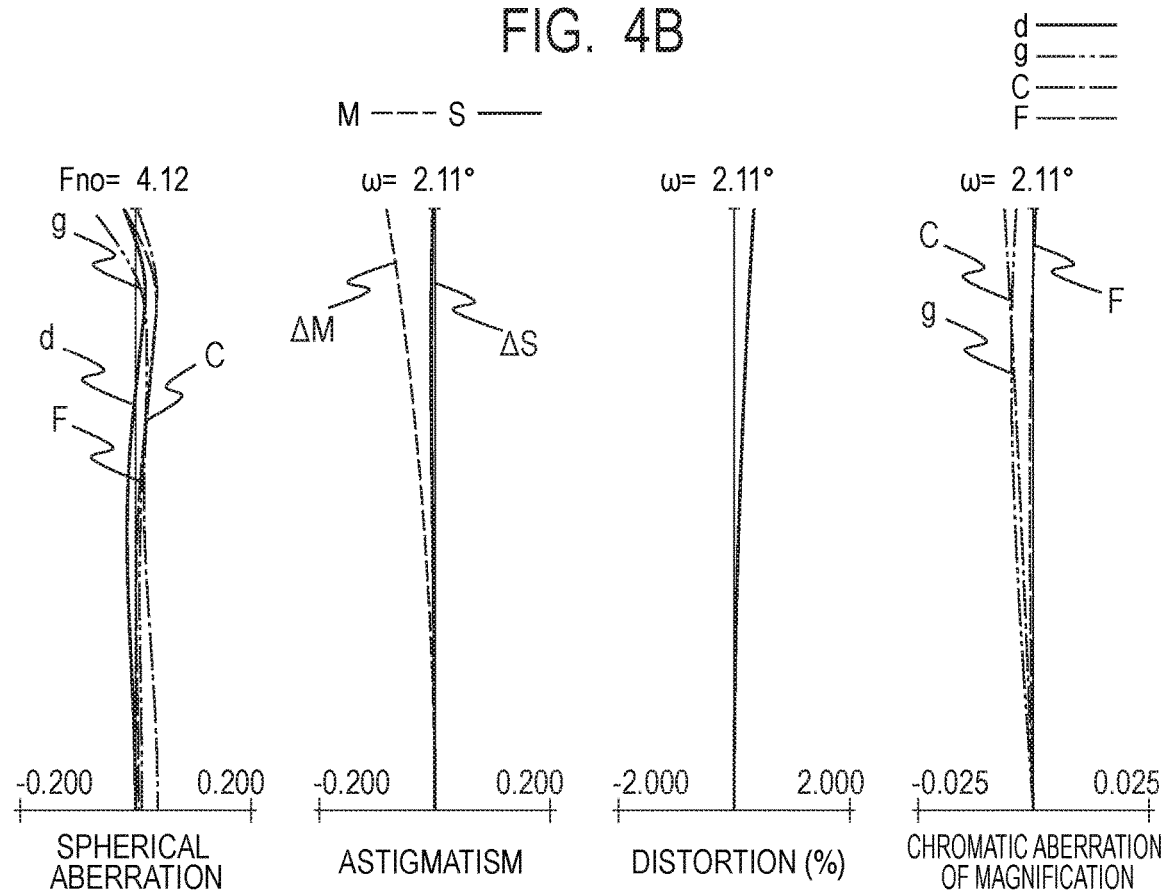
FIG. 4B is an aberration diagram of the optical system according to Embodiment 4 of the present invention when focused at infinity.
Figure 5A:
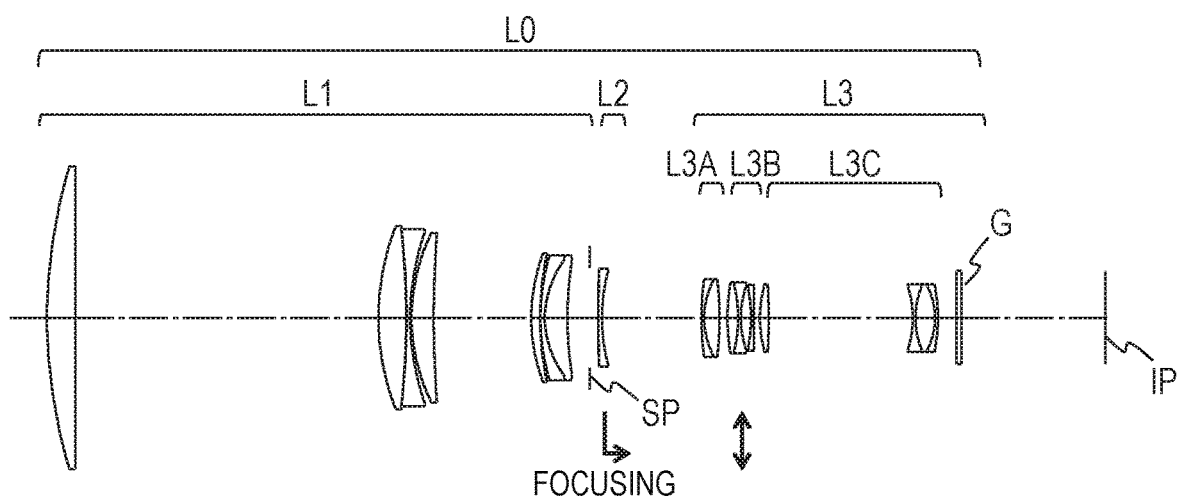
FIG. 5A is a lens cross-sectional view of an optical system according to Embodiment 5 of the present invention when focused at infinity.
Figure 5B:
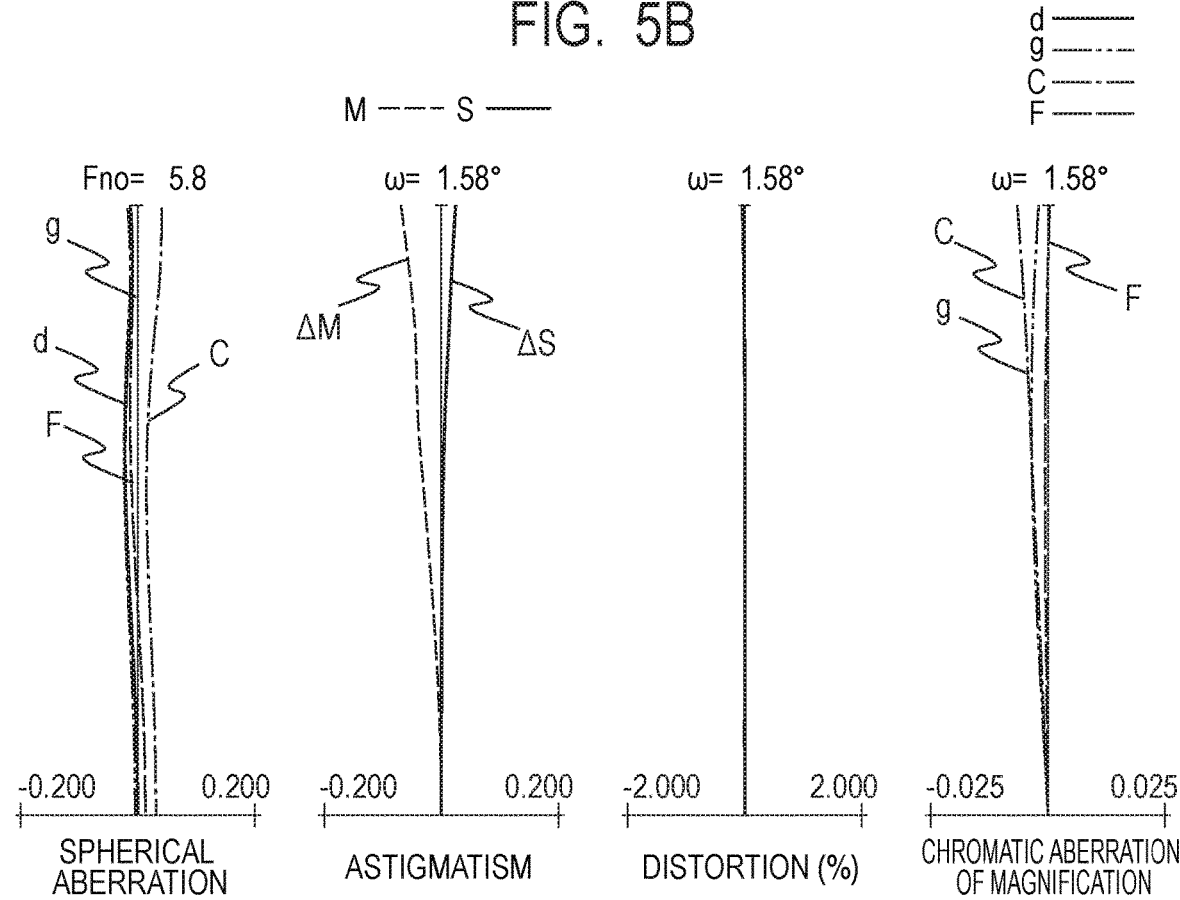
FIG. 5B is an aberration diagram of the optical system according to Embodiment 5 of the present invention when focused at infinity.
Figure 6:
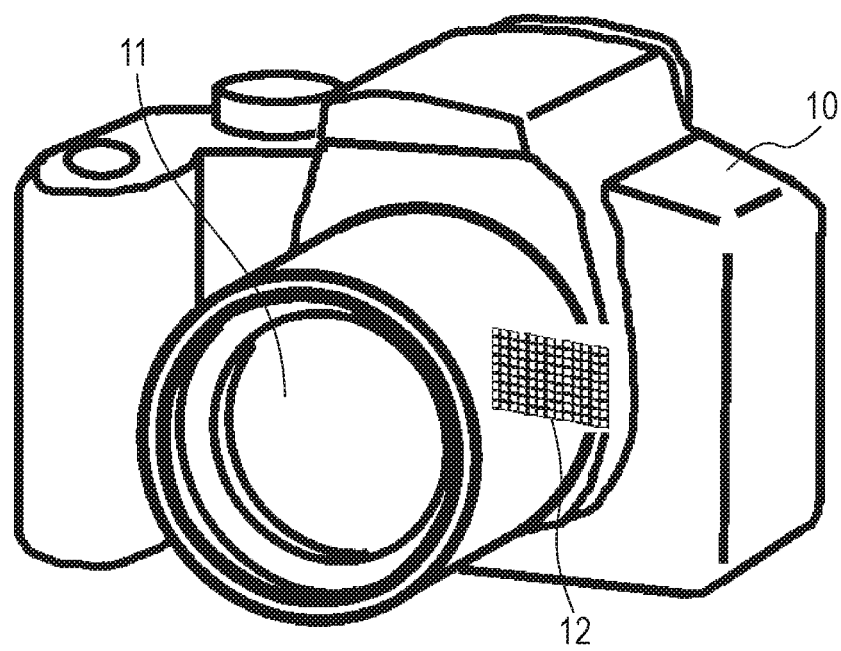
FIG. 6 is an explanatory view of an image pickup apparatus according to one embodiment of the present invention.

FIG. 1A, FIG. 2A, FIG. 3A, FIG. 4A, and FIG. 5A are lens cross-sectional views of optical systems according to Embodiments 1 to 5 of the present invention, respectively. FIG. 1B, FIG. 2B, FIG. 3B, FIG. 4B, and FIG. 5B are aberration diagrams of the optical systems according to Embodiments 1 to 5, respectively. FIG. 6 is a schematic view of a main part of a single lens reflex camera system (image pickup apparatus) including the optical system according to one embodiment of the present invention.

Embodiment 1 relates to an optical system of a telephoto type having an f-number of 2.9 and an image pickup half angle of view of 4.2°. Embodiment 2 relates to an optical system of a telephoto type having an f-number of 2.9 and an image pickup half angle of view of 3.2°. Embodiment 3 relates to an optical system of a telephoto type having an f-number of 4.1 and an image pickup half angle of view of 2.5°. Embodiment 4 relates to an optical system of a telephoto type having an f-number of 4.1 and an image pickup half angle of view of 2.1°. Embodiment 5 relates to an optical system of a telephoto type having an f-number of 5.8 and an image pickup half angle of view of 1.6°.

The optical system according to each of Embodiments is an image pickup optical system for use with an image pickup apparatus, for example, a video camera, a digital still camera, a monitoring camera, or a TV camera. The optical system according to each of Embodiments may also be used as a projection optical system for a projection device (projector). In the lens cross-sectional views, the left side is an object side (front side), and the right side is an image side (rear side).

In the lens cross-sectional views, an optical system L0 includes a first lens unit L1 having a positive refractive power, a second lens unit L2 having a negative refractive power, and a third lens unit L3 having a positive or negative refractive power. The third lens unit L3 includes, in order from the object side to the image side, a first sub-lens unit L3A having a positive refractive power, which is configured not to move, a second sub-lens unit L3B having a negative refractive power for correction of image blurring, which is configured to move in a direction containing a component in a direction perpendicular to an optical axis during correction of image blurring, and a third sub-lens unit L3C, which is configured not to move.

An aperture stop SP, which is configured to determine (restrict) a light flux at the minimum f-number (Fno), is arranged between the first lens unit L1 and the second lens unit L2. A glass block, for example, an optical filter, is denoted by G. As an image plane IP, an image pickup surface of a solid-state image pickup element (photoelectric conversion element), for example, a CCD sensor or a CMOS sensor, is placed when in use as a photographing optical system of a video camera or a digital still camera. The arrow regarding focus indicates a movement direction of a lens unit during focusing from infinity to proximity.

Moreover, in the optical system according to each of Embodiments, some lenses of the third lens unit L3 are used as a sub-lens unit for image stabilization to correct image blurring. The correction of image blurring may be performed by any one of the first lens unit L1, the second lens unit L2, and the third lens unit L3. Further, some lenses included in a particular lens unit may be used as the sub-lens unit for image stabilization.

In the aberration diagrams, an f-number is represented by Fno. An image pickup half angle of view (degrees) is represented by "ω", and is an angle of view calculated by paraxial calculation. In the spherical aberration diagrams, "d" indicates a d-line (wavelength: 587.56 nm), "g" indicates a g-line (wavelength: 435.835 nm), C indicates a C-line (wavelength: 656.27 nm), and F indicates an F-line (wavelength: 486.13 nm). In the astigmatism diagrams, ΔS indicates a sagittal image plane with respect to the d-line, and ΔM indicates a meridional image plane with respect to the d-line. The distortion is depicted for the d-line. In the diagrams of chromatic aberration of magnification, "g" indicates a g-line, C indicates a C-line, and F indicates an F-line.

In many optical systems, as a total lens length (length from the first lens surface on the object side to an image plane) becomes shorter to downsize the entire optical system, an amount of various aberrations, in particular, chromatic aberrations such as axial chromatic aberration and chromatic aberration of magnification, that occurs, becomes larger, and optical performance is reduced. In particular, in an optical system of a telephoto type in which the total lens length is reduced, as a focal length becomes longer, the amount of chromatic aberrations that occurs becomes larger. Moreover, as the focal length becomes longer, an effective diameter of the first lens unit having the positive refractive power tends to become larger in size. Therefore, in order to downsize the entire optical system, it is important to appropriately set a lens configuration of the first lens unit L1.

Further, in the optical system of the telephoto type, an effective diameter becomes larger as a lens becomes closer to the object side. Therefore, as the f-number becomes smaller, an effective diameter of a lens on the object side also becomes larger, and accordingly an outer diameter of the lens also becomes larger, with the result that a mass of the lens is increased in proportion to approximately the third power of the outer diameter. Therefore, it becomes very important to appropriately set a refractive index, an Abbe number, a specific gravity, secondary dispersion, and the like of a material of a lens closest to the object side in the first lens unit L1.

The optical system L0 according to one embodiment of the present invention includes, in order from the object side to the image side, the first lens unit L1 having the positive refractive power, the second lens unit L2 having the negative refractive power, which is configured to move during focusing, and the third lens unit L3. An interval between each pair of adjacent lens units is changed during focusing. The first lens unit L1 includes three or more positive lenses including a positive lens G1P closest to the object side. A distance (total lens length obtained when parallel plates such as a filter are removed) on the optical axis from a lens surface closest to the object side of the optical system L0 to the image plane is represented by LD. A focal length of the optical system L0 is represented by "f", and a refractive index and an Abbe number of a material of the positive lens G1P are represented by ndG1P and vdG1P, respectively.

Then, the following conditional expressions are satisfied:

$LD/f<1.0$ (1);

$1.58<ndG1P<1.80$ (2); and $50<vdG1P<75$ (3).

When refractive indices with respect to the d-line, the F-line, the C-line, and the g-line of the Fraunhofer lines are represented by Nd, NF, NC, and Ng, respectively, an Abbe number "νd" and a relative partial dispersion θgF of a material are defined as:

$$\nu d=(Nd-1)/(NF-NC); \text{ and}$$

$$\theta gF=(Ng-NF)/(NF-NC).$$

Now, technical meanings of the above-mentioned conditional expressions are described. The conditional expression (1) indicates that the total lens length LD is shorter than the focal length "f" of the entire optical system. The "total lens length" as used herein refers to a value obtained by adding an air-equivalent value of back focus BF to a length (total optical length) on the optical axis from a vertex of the lens surface on the object side of the lens closest to the object side to a lens surface on the image side of a lens closest to the image side.

When the total lens length is to be reduced significantly, it becomes difficult to correct axial chromatic aberration and chromatic aberration of magnification in a balanced manner with only a front lens unit on the object side of the aperture stop SP. Therefore, it is required to correct chromatic aberrations also with rear lens units on the image side of the aperture stop SP, for example. When the upper limit of the conditional expression (1) is exceeded, aberration correction becomes easy, but the optical system is increased in size, with the result that a lens barrel configured to hold the optical system is increased in size.

The conditional expressions (2) and (3) define the refractive index and the Abbe number with respect to the d-line of the positive lens G1P located closest to the object side in the first lens unit L1, and are mainly intended to satisfactorily correct spherical aberration and chromatic aberration of magnification, for example, while reducing the total lens length. When the upper limit of the conditional expression (2) is exceeded, it becomes easy to downsize the entire optical system, but the refractive power becomes much higher, with the result that a meniscus shape of the positive lens G1P becomes stronger when spherical aberration is corrected, and that it becomes difficult to correct distortion. When the lower limit of the conditional expression (2) is exceeded, curvatures of the lens surfaces become stronger in order to obtain a refractive power required of the positive lens G1P, and as a result, an amount of higher-order spherical aberration becomes larger.

When the upper limit of the conditional expression (3) is exceeded, it becomes easy to correct axial chromatic aberration. However, because of characteristics of the optical material, as the Abbe number becomes larger, the refractive index becomes smaller, with the result that it becomes difficult to correct spherical aberration and comatic aberration, for example. When the lower limit of the conditional expression (3) is exceeded, and the Abbe number becomes smaller, it becomes difficult to correct axial chromatic aberration and chromatic aberration of magnification.

In each of Embodiments, each element is appropriately set so as to satisfy the conditional expressions (1) to (3) so that the optical system that is light and in which various aberrations such as chromatic aberrations are satisfactorily corrected is obtained.

In each of Embodiments, it is further preferred to set the numerical value ranges of the conditional expressions (2) and (3) as follows.

$$1.585 < ndG1 < 1.700 \quad (2a)$$

$$55 < \nu dG1/72 \quad (3a)$$

It is further preferred to set the numerical value ranges of the conditional expressions (2a) and (3a) as follows.

$$1.59 < ndG1 < 1.65 \quad (2b)$$

$$58 < \nu dG1 < 70 \quad (3b)$$

In one embodiment of the present invention, the configuration of each lens unit is appropriately set as described above to obtain the optical system having high image forming performance in which a wide angle of view and a large aperture ratio are achieved and chromatic aberrations are satisfactorily corrected. In each of Embodiments, it is further preferred to satisfy one or more of the conditional expressions provided below. A relative partial dispersion of the material of the positive lens G1P is represented by θgFG1P. A focal length of the positive lens G1P is represented by fG1P, and a focal length of the first lens unit is represented by f1. Curvature radii of a lens surface on the object side and a lens surface on the image side of the positive lens G1P are represented by R1G1P and R2G1P, respectively.

A focal length of the second lens unit L2 is represented by f2. The first lens unit L1 includes a plurality of negative lenses, and an Abbe number and a relative partial dispersion of a material of a negative lens G1N located closest to the object side of the negative lenses included in the first lens unit L1 are represented by νdG1N and θgFG1N, respectively. Curvature radii of a lens surface on the object side and a lens surface on the image side of the negative lens G1N are represented by R1G1N and R2G1N, respectively. A distance on the optical axis from the lens surface on the image side of the positive lens G1P to the lens surface on the object side of the negative lens G1N is represented by dPN.

A focal length of the negative lens G1N is represented by fG1N. A Knoop hardness of the positive lens G1P is represented by HKG1P. A distance on the optical axis from a vertex of a lens surface on the image side of the second lens unit L2 to the image plane is represented by dF2.

A "Knoop hardness" as used herein is one of measures indicating a hardness of a material, and one kind of indentation hardness. Moreover, a Knoop hardness HK is calculated by dividing a test load by a surface area of indentation and a correction factor as follows:

$$HK = P/C_p L^2,$$

where:
$L^2$=surface area of indentation (unit: mm$^2$);
$C_p$=correction factor 0.070279; and
P=test load (unit: kgf).

In this case, it is preferred to satisfy one or more of the following conditional expressions.

$$0.534 < \theta gFG1P < 0.560 \quad (4)$$

$$0.40 < fG1P/f1 < 1.5 \quad (5)$$

$$0.7 < (R2G1P+R1G1P)/(R2G1P-R1G1P) < 5.5 \quad (6)$$

$$-2.8 < f1/f2 < -1.2 \quad (7)$$

$$24 < \nu dG1N < 45 \quad (8)$$

$$0.58 < \theta gFG1N < 0.595 \quad (9)$$

$$-1.0 < (R2G1N+R1G1N)/(R2G1N-R1G1N) < -0.1 \quad (10)$$

$$0.17 < dPN/f < 0.45 \quad (11)$$

$$1.5 < |fG1P/fG1N| < 3.0 \quad (12)$$

$$0.3<f1/f<0.7 \quad (13)$$

$$350<HKG1P<500 \quad (14)$$

$$0.2<dF2/LD<0.5 \quad (15)$$

Now, technical meanings of the above-mentioned conditional expressions are described. The conditional expression (4) defines the relative partial dispersion of the material of the positive lens G1P located closest to the object side in the first lens unit L1, and is mainly intended to correct chromatic aberration of magnification and axial chromatic aberration in a balanced manner.

When the upper limit of the conditional expression (4) is exceeded, it becomes easy to correct axial chromatic aberration. However, because of characteristics of the optical material, the refractive index becomes smaller, the refractive power of the material of the positive lens G1P becomes weaker, and the amount of higher-order spherical aberration that occurs becomes larger. When the lower limit of the conditional expression (4) is exceeded, the effect of correcting axial chromatic aberration by the positive lens G1P is reduced, and a share of chromatic aberrations held by a lens on the image side of the positive lens G1P is increased, with the result that it is required to arrange a lens having a large relative partial dispersion at a position at which an incidence height of a ray is high. Then, an effective diameter of the lens on the image side of the positive lens G1P is increased, and a mass of the lens is also disadvantageously increased.

The conditional expression (5) defines the focal length of the positive lens G1P located closest to the object side in the first lens unit L1 by the focal length of the first lens unit L1. The conditional expression (1) is intended to reduce a mass of the first lens unit L1 while satisfactorily correcting spherical aberration.

When the upper limit of the conditional expression (5) is exceeded, and the refractive power of the positive lens G1P becomes weaker, the negative refractive power of the second lens unit L2 relatively becomes much weaker (absolute value of the negative refractive power becomes much smaller), and large amounts of spherical aberration and axial chromatic aberration occur during focusing to proximity. When the lower limit of the conditional expression (5) is exceeded, the focal length of the positive lens G1P becomes shorter, and a refractive action becomes stronger, a large amount of spherical aberration occurs, and further a large amount of axial chromatic aberration occurs.

The conditional expression (6) defines a lens shape of the positive lens G1P located closest to the object side in the first lens unit L1, and is mainly intended to satisfactorily correct spherical aberration. When the upper limit of the conditional expression (6) is exceeded, the meniscus shape of the positive lens G1P becomes stronger, strong distortion occurs on a positive side, and it becomes difficult to produce the lens. When the lower limit of the conditional expression (6) is exceeded, spherical aberration is disadvantageously overcorrected.

The conditional expression (7) defines a ratio between the focal lengths of the first lens unit L1 and the second lens unit L2, and is mainly intended to reduce a variation in spherical aberration caused by focusing.

When the upper limit of the conditional expression (7) is exceeded, the focal length of the first lens unit L1 becomes shorter, and the refractive power thereof becomes stronger, convergence of the light flux that enters the second lens unit becomes stronger. Then, when the variation in various aberrations caused by focusing is to be reduced, it is required to strengthen the negative refractive power of the second lens unit L2, and sensitivity of spherical aberration to a manufacturing error becomes disadvantageously higher. When the lower limit of the conditional expression (7) is exceeded, and the negative refractive power of the second lens unit L2 becomes stronger, it becomes easy to reduce the total lens length, but a variation in axial chromatic aberration caused by focusing is increased.

The conditional expressions (8) and (9) define the Abbe number and the relative partial dispersion of the material of the negative lens G1N located closest to the object side of the plurality of negative lenses included in the first lens unit L1. The conditional expressions (8) and (9) are intended to reduce a secondary spectrum of axial chromatic aberration, and to effectively achromatize the first lens unit L1.

When the upper limit of the conditional expression (8) is exceeded, the curvatures of the lens surfaces become larger to obtain a refractive power of the lens that is required for the achromatization, and as a result, a large amount of higher-order aberrations occurs. When the lower limit of the conditional expression (8) is exceeded, it becomes easy to downsize the entire optical system, but with the use of a material having a large dispersion, a variation in spherical aberration for each wavelength becomes disadvantageously larger.

When the upper limit of the conditional expression (9) is exceeded, the relative partial dispersion becomes larger, and it becomes difficult to reduce the secondary spectrum of axial chromatic aberration. When the lower limit of the conditional expression (9) is exceeded, the secondary spectrum of axial chromatic aberration is reduced. However, because of characteristics of the material, as the relative partial dispersion becomes smaller, the Abbe number becomes larger, and it becomes difficult to correct primary chromatic aberrations.

The conditional expression (10) relates to a lens shape of the negative lens G1N located closest to the object side of the negative lenses included in the first lens unit L1. The conditional expression (10) is mainly intended to appropriately correct spherical aberration and comatic aberration. When the upper limit of the conditional expression (10) is exceeded, and the curvature radius of the lens surface on the object side of the negative lens G1N becomes smaller, it becomes difficult to correct comatic aberration. When the lower limit of the conditional expression (10) is exceeded, it becomes difficult to correct axial chromatic aberration and comatic aberration in a balanced manner.

The conditional expression (11) defines a ratio of the distance dPN on the optical axis between the positive lens G1P and the negative lens G1N to the focal length "f" of the entire lens system. When the upper limit of the conditional expression (11) is exceeded, and the distance dPN becomes longer, an incidence height of an axial ray that enters the negative lens G1N becomes lower, and it becomes difficult to satisfactorily correct spherical aberration in the negative lens G1N. When the lower limit value of the conditional expression (11) is exceeded, and the distance dPN becomes shorter, the distance between the positive lens G1P and the negative lens G1N becomes much shorter, an effective diameter of the negative lens G1N becomes larger, and a mass of the negative lens G1N is disadvantageously increased.

The conditional expression (12) defines a ratio between the focal lengths of the positive lens G1P and the negative lens G1N. The conditional expression (12) is intended to achieve the high image forming performance while reducing the weight of the entire optical system. When the lower limit of the conditional expression (12) is exceeded, and the focal length of the positive lens G1P becomes shorter, a large amount of spherical aberration occurs, and in order to correct spherical aberration, it is required to arrange the negative lens G1N on the object side where an incidence height of the ray is high, and it becomes difficult to correct spherical aberration and axial chromatic aberration in a balanced manner. When the upper limit of the conditional expression (12) is exceeded, and the focal length of the positive lens G1P becomes longer, the refractive action thereof becomes weaker, and the negative lens G1N is increased in size in its radial direction.

The conditional expression (13) defines a ratio between the focal length f1 of the first lens unit L1 and the focal length "f" of the entire optical system. When the upper limit of the conditional expression (13) is exceeded, and the focal length f1 of the first lens unit L1 becomes longer, the positive refractive power of the first lens unit L1 becomes much weaker, and the total lens length is increased. When the lower limit of the conditional expression (13) is exceeded, and the focal length f1 of the first lens unit L1 becomes shorter, the positive refractive power of the first lens unit L1 becomes stronger, and it becomes difficult to correct spherical aberration and axial chromatic aberration.

The conditional expression (14) defines the Knoop hardness HK of the material of the positive lens G1P. Moreover, the Knoop hardness HK is preferably from about 350 to about 500, more preferably from about 360 to about 460, and further preferably from about 380 to about 450. When the Knoop hardness HK satisfies such a value, chemical resistance of an optical component is further increased. Moreover, it becomes easy to polish the optical component so as not to deteriorate a surface thereof. When the conditional expression (15) is satisfied, it becomes easy to reduce the weight of the entire optical system.

It is further preferred to set the numerical value ranges of the conditional expressions (4) to (15) as follows.

$$0.534 < \theta gFG1P < 0.555 \quad (4a)$$

$$0.45 < fG1P/f1 < 1.0 \quad (5a)$$

$$0.75 < (R2G1P+R1G1P)/(R2G1P-R1G1P) < 3.00 \quad (6a)$$

$$-2.5 < f1/f2 < -1.5 \quad (7a)$$

$$28 < vdG1N < 35 \quad (8a)$$

$$0.585 < \theta gFG1N < 0.593 \quad (9a)$$

$$-0.90 < (R2G1N+R1G1N)/(R2G1N-R1G1N) < -0.15 \quad (10a)$$

$$0.18 < dPN/f < 0.40 \quad (11a)$$

$$1.7 < |fG1P/fG1N| < 2.7 \quad (12a)$$

$$0.32 < f1/f < 0.60 \quad (13a)$$

$$360 < HKG1P < 460 \quad (14a)$$

$$0.30 < dF2/LD < 0.49 \quad (15a)$$

It is further preferred to set the numerical value ranges of the conditional expressions (4a) to (15a) as follows.

$$0.535 < \theta gFG1P < 0.550 \quad (4b)$$

$$0.48 < fG1P/f1 < 0.96 \quad (5b)$$

$$0.80 < (R2G1P+R1G1P)/(R2G1P-R1G1P) < 1.80 \quad (6b)$$

$$-2.3 < f1/f2 < -1.6 \quad (7b)$$

$$30 < vdG1N < 34 \quad (8b)$$

$$0.587 < \theta gFG1N < 0.590 \quad (9b)$$

$$-0.86 < (R2G1N+R1G1N)/(R2G1N-R1G1N) < -0.25 \quad (10b)$$

$$0.19 < dPN/f < 0.36 \quad (11b)$$

$$1.90 < |fG1P/fG1N| < 2.45 \quad (12b)$$

$$0.34 < f1/f < 0.55 \quad (13b)$$

$$380 < HKG1P < 450 \quad (14b)$$

$$0.35 < dF2/LD < 0.48 \quad (15b)$$

It is preferred for the optical system according to each of Embodiments to include the aperture stop SP arranged on the object side of the second lens unit L2 to be adjacent to the second lens unit L2.

It is preferred that the third lens unit L3 consist of, in order from the object side to the image side, the first sub-lens unit L3A having the positive refractive power, the second sub-lens unit L3B having the negative refractive power, and the third sub-lens unit L3C. Further, it is desired that the second sub-lens unit L3B be configured to move in the direction containing the component in the direction perpendicular to the optical axis to perform correction of image blurring. With this configuration, it becomes easy to reduce a diameter of a sub-lens unit for correction of image blurring. It is preferred that the third lens unit L3 include a cemented lens formed by cementing a negative lens and a positive lens closest to the object side. With this configuration, it becomes easy to correct off-axial comatic aberration and correct spherical aberration.

Next, a digital still camera (image pickup apparatus) according to one embodiment of the present invention, which uses the optical system according to one embodiment of the present invention as an image pickup optical system, is described with reference to FIG. 6. In FIG. 6, a camera main body 10, and an image pickup optical system 11 consisting of the optical system described in one of Embodiments 1 to 5 are illustrated. An image pickup element (photo-electric conversion element) 12, for example, a CCD sensor or a CMOS sensor, is included in the camera main body, and is configured to receive an object image formed by the image pickup optical system 11.

Numerical Data corresponding to Embodiments 1 to 5 of the present invention is described below. In each set of Numerical Data, the order of a surface from the object side is represented by "i", a curvature radius of the i-th surface from the object side is represented by "ri", an interval between the i-th surface and the (i+1)-th surface from the object side is represented by "di", and a refractive index and an Abbe number of an optical member between the i-th surface and the (i+1)-th surface are represented by "ndi" and "vdi", respectively. The focal length, the f-number, and a half angle of view (degrees) of the entire optical system when focused on an object at infinity are shown. The air-equivalent value (distance obtained when parallel plates such as a filter are removed) of back focus is represented by BF.

In each set of Numerical Data, two surfaces closest to the image side correspond to a glass block, for example, a filter. Relationships between the conditional expressions described above and various numerical values in Embodiments are shown in Table 1.

[Numerical Data 1]
Unit: mm

Surface data

| Surface number | r | d | nd | νd | θgF |
|---|---|---|---|---|---|
| 1 | 142.636 | 10.36 | 1.61800 | 63.40 | 0.5395 |
| 2 | 803.414 | 87.02 | | | |
| 3 | 64.050 | 11.52 | 1.43387 | 95.10 | 0.5373 |
| 4 | −4,275.797 | 0.53 | | | |
| 5 | −789.539 | 1.20 | 1.80610 | 33.27 | 0.5881 |
| 6 | 61.251 | 0.25 | | | |
| 7 | 55.129 | 9.48 | 1.43387 | 95.10 | 0.5373 |
| 8 | 293.161 | 5.47 | | | |
| 9 | 67.158 | 3.97 | 1.89286 | 20.36 | 0.6393 |
| 10 | 114.029 | 0.15 | | | |
| 11 | 47.312 | 1.40 | 1.83481 | 42.74 | 0.5648 |
| 12 | 30.444 | 10.09 | 1.43875 | 94.66 | 0.5340 |
| 13 | 113.939 | 5.13 | | | |
| 14 (Stop) | ∞ | 3.69 | | | |
| 15 | 567.430 | 1.20 | 1.60300 | 65.44 | 0.5401 |
| 16 | 43.779 | 16.52 | | | |
| 17 | 93.335 | 1.20 | 1.89286 | 20.36 | 0.6393 |
| 18 | 58.681 | 4.90 | 1.49700 | 81.54 | 0.5375 |
| 19 | −115.284 | 5.67 | | | |
| 20 | 80.365 | 4.02 | 1.85025 | 30.05 | 0.5979 |
| 21 | −65.106 | 1.20 | 1.62299 | 58.16 | 0.5458 |
| 22 | 28.801 | 4.48 | | | |
| 23 | −49.796 | 1.20 | 1.77250 | 49.60 | 0.5520 |
| 24 | 83.318 | 3.95 | | | |
| 25 | 94.977 | 2.93 | 1.69895 | 30.13 | 0.6030 |
| 26 | −154.696 | 5.82 | | | |
| 27 | 59.250 | 1.20 | 1.94595 | 17.98 | 0.6544 |
| 28 | 40.611 | 6.51 | 1.66565 | 35.64 | 0.5824 |
| 29 | −262.154 | 4.96 | | | |
| 30 | ∞ | 2.20 | 1.51633 | 64.14 | 0.5353 |
| 31 | ∞ | 58.94 | | | |
| Image plane | ∞ | | | | |

Various data

| Focal length | 294.00 |
|---|---|
| F-number | 2.91 |
| Half angle of view (degrees) | 4.21 |
| Image height | 21.64 |
| Total lens length | 276.40 |
| BF | 65.35 |

Lens unit data

| Unit | First surface | Focal length |
|---|---|---|
| 1 | 1 | 132.30 |
| 2 | 15 | −78.74 |
| 3 | 17 | 341.78 |

[Numerical Data 2]
Unit: mm

Surface data

| Surface number | r | d | nd | νd | θgF |
|---|---|---|---|---|---|
| 1 | 154.557 | 14.23 | 1.59522 | 67.74 | 0.5442 |
| 2 | 679.875 | 120.54 | | | |
| 3 | 94.858 | 14.30 | 1.43700 | 95.10 | 0.5326 |
| 4 | −305.077 | 0.17 | | | |
| 5 | −287.520 | 1.50 | 1.80610 | 33.27 | 0.5881 |
| 6 | 74.517 | 2.79 | | | |
| 7 | 74.499 | 11.84 | 1.43700 | 95.10 | 0.5326 |
| 8 | ∞ | 17.88 | | | |
| 9 | 67.131 | 5.78 | 1.89286 | 20.36 | 0.6393 |
| 10 | 126.369 | 1.51 | | | |
| 11 | 70.332 | 2.00 | 1.83400 | 37.16 | 0.5776 |
| 12 | 40.254 | 10.32 | 1.43700 | 95.10 | 0.5326 |
| 13 | 136.354 | 6.96 | | | |
| 14 (Stop) | ∞ | 5.00 | | | |
| 15 | −565.896 | 1.60 | 1.61800 | 63.40 | 0.5395 |
| 16 | 60.047 | 36.49 | | | |
| 17 | 100.609 | 1.40 | 1.89286 | 20.36 | 0.6393 |
| 18 | 65.898 | 7.56 | 1.51742 | 52.43 | 0.5564 |
| 19 | −93.940 | 1.00 | | | |
| 20 | 93.498 | 5.02 | 1.80610 | 33.27 | 0.5881 |
| 21 | −121.171 | 1.20 | 1.53775 | 74.70 | 0.5392 |
| 22 | 36.544 | 5.43 | | | |
| 23 | −82.448 | 1.20 | 1.72916 | 54.68 | 0.5444 |
| 24 | 68.589 | 3.01 | | | |
| 25 | 137.981 | 4.68 | 1.65412 | 39.68 | 0.5737 |
| 26 | −1,080.069 | 6.25 | | | |
| 27 | 71.025 | 10.18 | 1.72047 | 34.71 | 0.5834 |
| 28 | −58.624 | 1.50 | 1.80810 | 22.76 | 0.6307 |
| 29 | −358.198 | 7.77 | | | |
| 30 | ∞ | 2.20 | 1.51633 | 64.14 | 0.5353 |
| 31 | ∞ | 60.70 | | | |
| Image plane | ∞ | | | | |

Various data

| Focal length | 392.00 |
|---|---|
| F-number | 2.90 |
| Half angle of view (degrees) | 3.16 |
| Image height | 21.64 |
| Total lens length | 371.25 |
| BF | 69.92 |

Lens unit data

| Unit | First surface | Focal length |
|---|---|---|
| 1 | 1 | 187.63 |
| 2 | 15 | −87.76 |
| 3 | 17 | 246.94 |

[Numerical Data 3]
Unit: mm

Surface data

| Surface number | r | d | nd | νd | θgF |
|---|---|---|---|---|---|
| 1 | 239.937 | 10.05 | 1.59349 | 67.00 | 0.5361 |
| 2 | 7,608.704 | 143.66 | | | |
| 3 | 92.480 | 11.58 | 1.43387 | 95.10 | 0.5373 |
| 4 | −608.676 | 0.07 | | | |
| 5 | −572.992 | 1.85 | 1.80610 | 33.27 | 0.5881 |
| 6 | 110.750 | 0.15 | | | |
| 7 | 80.486 | 7.96 | 1.43387 | 95.10 | 0.5373 |
| 8 | 268.516 | 29.41 | | | |
| 9 | 74.048 | 3.77 | 1.92286 | 18.90 | 0.6495 |
| 10 | 114.076 | 0.15 | | | |
| 11 | 81.966 | 2.10 | 1.83481 | 42.74 | 0.5648 |
| 12 | 40.684 | 10.10 | 1.43700 | 95.10 | 0.5326 |
| 13 | 211.722 | 13.05 | | | |
| 14 (Stop) | ∞ | 3.76 | | | |
| 15 | 454.394 | 1.60 | 1.59522 | 67.74 | 0.5442 |
| 16 | 67.563 | 42.53 | | | |
| 17 | 250.115 | 1.30 | 1.89286 | 20.36 | 0.6393 |
| 18 | 41.548 | 4.42 | 1.80610 | 33.27 | 0.5881 |
| 19 | −259.897 | 2.39 | | | |
| 20 | 69.730 | 4.44 | 1.66680 | 33.05 | 0.5957 |
| 21 | −54.212 | 1.30 | 1.59522 | 67.74 | 0.5442 |
| 22 | 42.897 | 3.59 | | | |
| 23 | −112.462 | 1.10 | 1.77250 | 49.60 | 0.5520 |
| 24 | 66.134 | 4.10 | | | |
| 25 | 75.201 | 2.95 | 1.76182 | 26.52 | 0.6136 |
| 26 | −469.229 | 31.57 | | | |
| 27 | 64.591 | 4.29 | 1.66565 | 35.64 | 0.5824 |
| 28 | 519.783 | 1.50 | 1.92286 | 20.88 | 0.6391 |

[Numerical Data 3]
Unit: mm

| | | | | | |
|---|---|---|---|---|---|
| 29 | 117.158 | 4.99 | | | |
| 30 | ∞ | 2.20 | 1.51633 | 64.14 | 0.5353 |
| 31 | ∞ | 59.59 | | | |
| Image plane | ∞ | | | | |

Various data

| | |
|---|---|
| Focal length | 490.00 |
| F-number | 4.12 |
| Half angle of view (degrees) | 2.53 |
| Image height | 21.64 |
| Total lens length | 410.77 |
| BF | 66.03 |

Lens unit data

| Unit | First surface | Focal length |
|---|---|---|
| 1 | 1 | 215.15 |
| 2 | 15 | −133.54 |
| 3 | 17 | 7,321.08 |

[Numerical Data 4]
Unit: mm

Surface data

| Surface number | r | d | nd | νd | θgF |
|---|---|---|---|---|---|
| 1 | 285.176 | 12.69 | 1.59349 | 67.00 | 0.5361 |
| 2 | −4,767.657 | 161.04 | | | |
| 3 | 122.017 | 15.58 | 1.43387 | 95.10 | 0.5373 |
| 4 | −233.175 | 0.00 | | | |
| 5 | −238.384 | 1.60 | 1.80610 | 33.27 | 0.5881 |
| 6 | 141.021 | 0.15 | | | |
| 7 | 93.182 | 10.34 | 1.43387 | 95.10 | 0.5373 |
| 8 | 377.979 | 45.03 | | | |
| 9 | 80.811 | 5.76 | 1.84666 | 23.88 | 0.6218 |
| 10 | 182.524 | 0.15 | | | |
| 11 | 120.397 | 2.00 | 1.80420 | 46.50 | 0.5572 |
| 12 | 44.703 | 13.45 | 1.43700 | 95.10 | 0.5326 |
| 13 | 642.625 | 15.35 | | | |
| 14 (Stop) | ∞ | 3.49 | | | |
| 15 | 491.750 | 1.60 | 1.59349 | 67.00 | 0.5361 |
| 16 | 62.367 | 38.06 | | | |
| 17 | 325.083 | 1.50 | 1.89286 | 20.36 | 0.6393 |
| 18 | 59.275 | 4.64 | 1.73800 | 32.26 | 0.5899 |
| 19 | −214.466 | 1.00 | | | |
| 20 | 74.220 | 4.00 | 1.80518 | 25.46 | 0.6156 |
| 21 | −119.987 | 1.30 | 1.59349 | 67.00 | 0.5361 |
| 22 | 41.290 | 4.13 | | | |
| 23 | −102.097 | 1.30 | 1.81600 | 46.62 | 0.5568 |
| 24 | 85.886 | 3.79 | | | |
| 25 | 68.860 | 5.13 | 1.85478 | 24.80 | 0.6122 |
| 26 | 2,687.062 | 30.08 | | | |
| 27 | 99.601 | 9.53 | 1.66565 | 35.64 | 0.5824 |
| 28 | −56.296 | 1.50 | 1.89286 | 20.36 | 0.6393 |
| 29 | 979.304 | 5.25 | | | |
| 30 | ∞ | 2.20 | 1.51633 | 64.14 | 0.5353 |
| 31 | ∞ | 73.90 | | | |
| Image plane | ∞ | | | | |

Various data

| | |
|---|---|
| Focal length | 588.00 |
| F-number | 4.12 |
| Half angle of view (degrees) | 2.11 |
| Image height | 21.64 |
| Total lens length | 474.78 |
| BF | 80.59 |

[Numerical Data 4]
Unit: mm

Lens unit data

| Unit | First surface | Focal length |
|---|---|---|
| 1 | 1 | 237.94 |
| 2 | 15 | −120.51 |
| 3 | 17 | −47,873.47 |

[Numerical Data 5]
Unit: mm

Surface data

| Surface number | r | d | nd | νd | θgF |
|---|---|---|---|---|---|
| 1 | 240.726 | 12.89 | 1.61800 | 63.40 | 0.5395 |
| 2 | ∞ | 138.98 | | | |
| 3 | 114.535 | 12.87 | 1.43387 | 95.10 | 0.5373 |
| 4 | −359.087 | 0.18 | | | |
| 5 | −332.929 | 1.50 | 1.80610 | 33.27 | 0.5881 |
| 6 | 117.700 | 0.64 | | | |
| 7 | 87.931 | 10.17 | 1.43387 | 95.10 | 0.5373 |
| 8 | 505.314 | 44.59 | | | |
| 9 | 82.410 | 4.12 | 1.89286 | 20.36 | 0.6393 |
| 10 | 139.657 | 0.15 | | | |
| 11 | 102.973 | 2.00 | 1.77250 | 49.60 | 0.5520 |
| 12 | 44.474 | 10.25 | 1.43387 | 95.10 | 0.5373 |
| 13 | 164.169 | 10.67 | | | |
| 14 (Stop) | ∞ | 3.94 | | | |
| 15 | 2,771.562 | 1.50 | 1.60311 | 60.64 | 0.5415 |
| 16 | 81.493 | 45.55 | | | |
| 17 | 135.371 | 1.20 | 1.89286 | 20.36 | 0.6393 |
| 18 | 36.458 | 7.13 | 1.63980 | 34.46 | 0.5922 |
| 19 | −142.839 | 3.59 | | | |
| 20 | 92.151 | 4.92 | 1.76182 | 26.52 | 0.6136 |
| 21 | −64.477 | 1.20 | 1.72916 | 54.68 | 0.5444 |
| 22 | 44.366 | 4.67 | | | |
| 23 | −78.668 | 1.20 | 1.76385 | 48.51 | 0.5587 |
| 24 | 401.999 | 2.82 | | | |
| 25 | 54.724 | 4.09 | 1.67270 | 32.10 | 0.5988 |
| 26 | −248.815 | 66.28 | | | |
| 27 | −46.725 | 1.20 | 1.43875 | 94.66 | 0.5340 |
| 28 | 39.037 | 8.98 | 1.59551 | 39.24 | 0.5803 |
| 29 | −31.547 | 1.30 | 1.92286 | 20.88 | 0.6391 |
| 30 | −78.510 | 8.46 | | | |
| 31 | ∞ | 2.20 | 1.51633 | 64.14 | 0.5353 |
| 32 | ∞ | 66.02 | | | |
| Image plane | ∞ | | | | |

Various data

| | |
|---|---|
| Focal length | 784.00 |
| F-number | 5.80 |
| Half angle of view (degrees) | 1.58 |
| Image height | 21.64 |
| Total lens length | 484.53 |
| BF | 75.94 |

Lens unit data

| Unit | First surface | Focal length |
|---|---|---|
| 1 | 1 | 269.42 |
| 2 | 15 | −139.24 |
| 3 | 17 | −439.91 |

TABLE 1

|  | Embodiment 1 | Embodiment 2 | Embodiment 3 | Embodiment 4 | Embodiment 5 |
|---|---|---|---|---|---|
| f | 294.000 | 392.000 | 490.000 | 588.000 | 784.000 |
| f1 | 132.302 | 187.630 | 215.151 | 237.938 | 269.417 |
| f2 | −78.739 | −87.757 | −133.542 | −120.515 | −139.243 |
| LD | 276.398 | 371.255 | 410.773 | 474.779 | 484.530 |
| fG1P | 278.955 | 332.698 | 417.233 | 453.812 | 389.525 |
| fG1N | −145.563 | −167.402 | −185.967 | −187.104 | −201.806 |
| R1G1P | 142.636 | 154.557 | 239.937 | 285.176 | 240.726 |
| R2G1P | 803.414 | 679.875 | 7,608.704 | −4,767.657 | inf |
| R1G1N | −789.539 | −287.520 | −572.992 | −238.384 | −332.929 |
| R2G1N | 61.251 | 74.517 | 110.750 | 141.021 | 117.700 |
| dPN | 99.069 | 135.006 | 155.308 | 176.614 | 152.034 |
| dF2 | 125.697 | 155.593 | 172.259 | 187.294 | 230.808 |
| Conditional Expression |  |  |  |  |  |
| (1) LD/f | 0.940 | 0.947 | 0.838 | 0.807 | 0.618 |
| (2) ndG1P | 1.61800 | 1.59522 | 1.59349 | 1.59349 | 1.61800 |
| (3) vdG1P | 63.40 | 67.74 | 67.00 | 67.00 | 63.40 |
| (4) θgFG1P | 0.540 | 0.544 | 0.536 | 0.536 | 0.540 |
| (5) fG1P/f1 | 0.949 | 0.849 | 0.851 | 0.772 | 0.497 |
| (6) (R2G1P + R1G1P)/(R2G1P − R1G1P) | 1.432 | 1.588 | 1.065 | 0.887 | 1.000 |
| (7) f1/f2 | −1.680 | −2.138 | −1.611 | −1.974 | −1.935 |
| (8) vdG1N | 33.27 | 33.27 | 33.27 | 33.27 | 33.27 |
| (9) θgFG1N | 0.588 | 0.588 | 0.588 | 0.588 | 0.588 |
| (10) (R2G1N + R1G1N)/(R2G1N − R1G1N) | −0.856 | −0.588 | −0.676 | −0.257 | −0.478 |
| (11) dPN/f | 0.337 | 0.344 | 0.317 | 0.300 | 0.194 |
| (12) \|fG1P/fG1N\| | 1.916 | 1.987 | 2.244 | 2.425 | 1.930 |
| (13) f1/f | 0.450 | 0.479 | 0.439 | 0.405 | 0.344 |
| (14) HKG1P | 445 | 390 | 440 | 440 | 445 |
| (15) dF2/LD | 0.455 | 0.419 | 0.419 | 0.394 | 0.476 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152258, filed Aug. 7, 2017, which is hereby incorporated by reference herein in its entirety.

What is claimed is:

1. An optical system comprising, in order from an object side to an image side:

a first lens unit having a positive refractive power;

a second lens unit having a negative refractive power configured to move during focusing; and a third lens unit, wherein an interval between each pair of adjacent lens units is changed during focusing, wherein the optical system comprises an aperture stop, wherein the first lens unit comprises at least three positive lenses including a positive lens G1P arranged closest to the object side and a plurality of negative lenses including a negative lens G1N located closest to the object side among the plurality of negative lenses, and wherein the conditional expressions:

$LD/f < 1.0;$ $1.58 < ndG1P < 1.8;$ $63 < vdG1P < 75;$ and $0.17 < dPN/f < 0.45,$ are satisfied where LD represents a distance on an optical axis from a lens surface closest to the object side of the optical system to an image plane, f represents a focal length of the optical system, ndG1P represents a refractive index of a material of the positive lens G1P, vdG1P represents an Abbe number of the material of the positive lens G1P, and dPN represents a distance on the optical axis from a lens surface on the image side of the positive lens G1P to a lens surface on the object side of the negative lens G1N.

2. The optical system according to claim 1, wherein the conditional expression:

$0.534 < \theta gFG1P < 0.560,$ is satisfied where θgFG1P represents a relative partial dispersion of the material of the positive lens G1P.

3. The optical system according to claim 1, wherein the conditional expression:

$0.7 < (R2G1P+R1G1P)/(R2G1P-R1G1P) < 5.5,$ is satisfied where R1G1P represents a curvature radius of a lens surface on the object side of the positive lens G1P, and R2G1P represents a curvature radius of a lens surface on the image side of the positive lens G1P.

4. The optical system according to claim 1, wherein the conditional expression:

$-2.8 < f1/f2 < -1.2,$ is satisfied where f1 represents a focal length of the first lens unit, and f2 represents a focal length of the second lens unit.

5. The optical system according to claim 1, wherein the conditional expressions:

$24 < vdG1N < 45;$ and $0.58 < \theta gFG1N < 0.595,$ are satisfied where vdG1N represents an Abbe number of a material of the negative lens G1N, and θgFG1N represents a relative partial dispersion of the material of the negative lens G1N.

6. The optical system according to claim 5, wherein the conditional expression:

$-1.0 < (R2G1N+R1G1N)/(R2G1N-R1G1N) < -0.1$, is satisfied where R1G1N represents a curvature radius of a lens surface on the object side of the negative lens G1N, and R2G1N represents a curvature radius of a lens surface on the image side of the negative lens G1N.

7. The optical system according to claim 5, wherein the conditional expression:

$1.5 < |fG1P/fG1N| < 3.0$, is satisfied where fG1P represents a focal length of the positive lens G1P, and fG1N represents a focal length of the negative lens G1N.

8. The optical system according to claim 1, wherein the conditional expression:

$0.3 < f1/f < 0.7$, is satisfied where f1 represents a focal length of the first lens unit.

9. The optical system according to claim 1, wherein the conditional expression:

$350 < HKG1P < 500$, is satisfied where HKG1P represents a Knoop hardness of the positive lens G1P.

10. The optical system according to claim 1, wherein the conditional expression:

$0.2 < dF2/LD < 0.5$, is satisfied where dF2 represents a distance on the optical axis from a lens surface on the image side of the second lens unit to the image plane.

11. The optical system according to claim 1, wherein the third lens unit comprises, in order from the object side to the image side:
   a first sub-lens unit;
   a second sub-lens unit; and
   a third sub-lens unit,
   wherein the first sub-lens unit and the third sub-lens unit are configured not to move during focusing and correction of image blurring, and
   wherein the second sub-lens unit is configured to move in a direction containing a component in a direction perpendicular to the optical axis during correction of image blurring.

12. The optical system according to claim 1, wherein the optical system consists of a plurality of lens units including the aperture stop, and
   wherein the plurality of lens units consist, in order from the object side to the image side, of the first lens unit, the second lens unit, and the third lens unit.

13. The optical system according to claim 12, wherein the third lens unit is configured not to move during focusing.

14. An image pickup apparatus comprising:
   an optical system comprising, in order from an object side to an image side:
      a first lens unit having a positive refractive power;
      a second lens unit having a negative refractive power configured to move during focusing; and
      a third lens unit,
      wherein an interval between each pair of adjacent lens units is changed during focusing,
      wherein the optical system comprises an aperture stop, wherein the first lens unit comprises at least three positive lenses including a positive lens G1P arranged closest to the object side and a plurality of negative lenses including a negative lens GIN located closest to the object side among the plurality of negative lenses, and
      wherein the conditional expressions:

$LD/f < 1.0$;

$1.58 < ndG1P < 1.8$;

$63 < vdG1P < 75$; and $0.17 < dPN/f < 0.45$, are satisfied where LD represents a distance on an optical axis from a lens surface closest to the object side of the optical system to an image plane, f represents a focal length of the optical system, ndG1P represents a refractive index of a material of the positive lens G1P, vdG1P represents an Abbe number of the material of the positive lens G1P, and dPN represents a distance on the optical axis from a lens surface on the image side of the positive lens GIP to a lens surface on the object side of the negative lens GIN; and
      an image pickup element configured to receive an image formed by the optical system.

15. An optical system comprising,
   an aperture stop, and
   three or more positive lenses disposed on an object side of the aperture stop, the three or more positive lenses including a positive lens G1P which is arranged closest to the object side, and
   a plurality of negative lenses including a negative lens GIN located closest to the object side among the plurality of negative lenses,
   wherein the conditional expressions:

$LD/f < 1.0$;

$1.58 < ndG1P < 1.8$;

$63 < vdG1P < 75$; and $0.17 < dPN/f < 0.45$, are satisfied where LD represents a distance on an optical axis from a lens surface closest to the object side of the optical system to an image plane, f represents a focal length of the optical system, ndG1P represents a refractive index of a material of the positive lens G1P, vdG1P represents an Abbe number of the material of the positive lens G1P, and dPN represents a distance on the optical axis from a lens surface on the image side of the positive lens GIP to a lens surface on the object side of the negative lens GIN.

16. The optical system according to claim 15, wherein the conditional expression:

$0.534 < \theta gFG1 < 0.560$, is satisfied where θgFG1P represents a relative partial dispersion of the material of the positive lens G1P.

17. The optical system according to claim 15, wherein the conditional expression:

$0.7 < (R2G1P+R1G1P)/(R2G1P-R1G1P) < 5.5$, is satisfied where R1G1P represents a curvature radius of a lens surface on the object side of the positive lens G1P, and R2G1P represents a curvature radius of a lens surface on the image side of the positive lens G1P.

18. The optical system according to claim 15, wherein the conditional expressions:

$24 < vdG1N < 45$; and $0.58 < \theta gFG1N < 0.595$, are satisfied where vdG1N represents an Abbe number of a material of the negative lens G1N, and θgFG1N represents a relative partial dispersion of the material of the negative lens G1N.

* * * * *